United States Patent Office 3,361,721
Patented Jan. 2, 1968

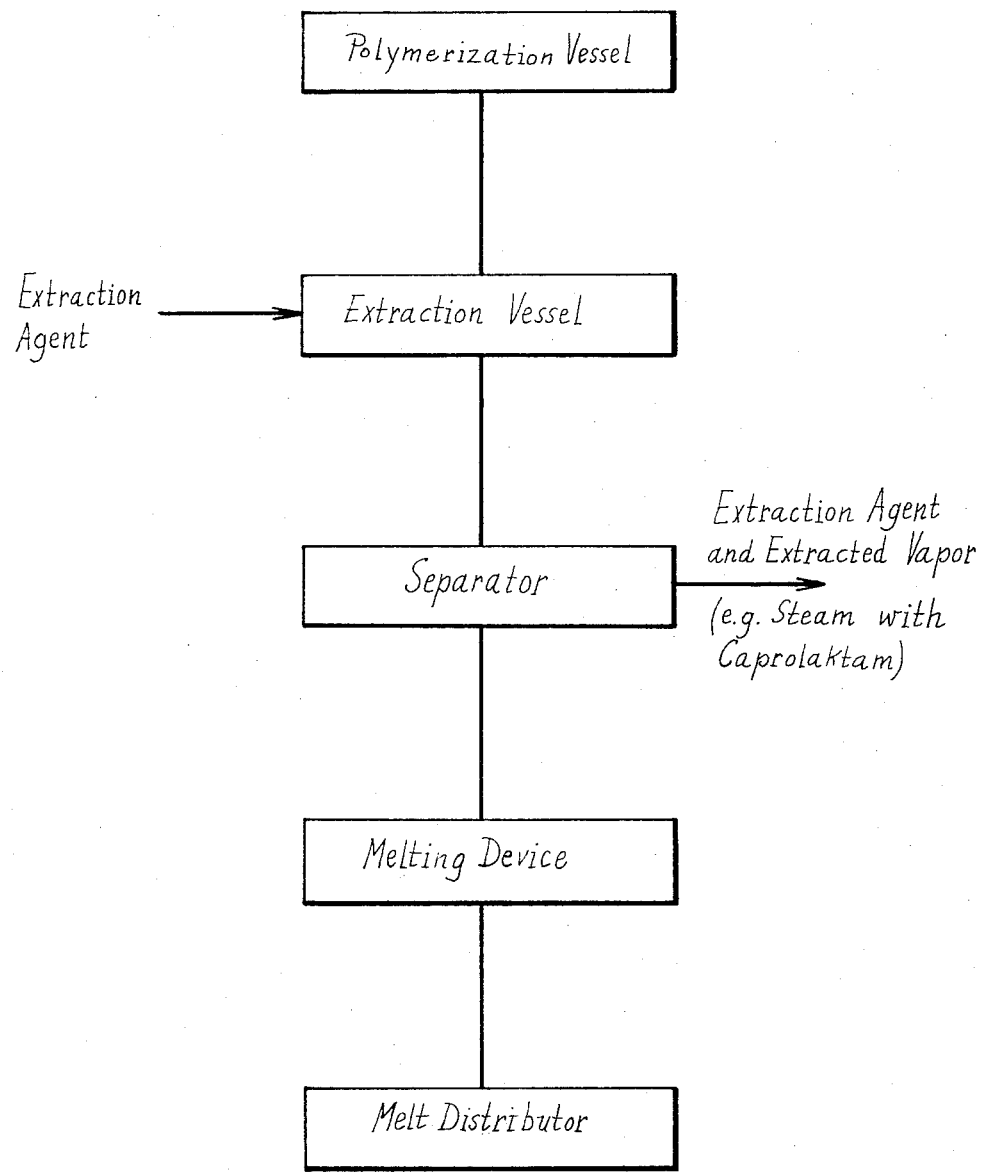

3,361,721
PROCESS FOR SEPARATING POLYAMIDE FROM MONOMER-REMOVING SOLVENT
Kurt Markel and Jürgen Steinberg, Rudolstadt, Thuringia, Germany, assignors to VEB Chemiefaserwerk Schwarza Wilhelm Pieck, Thuringia, Germany
Continuation of application Ser. No. 397,301, Sept. 17, 1964. This application Apr. 4, 1967, Ser. No. 633,659
6 Claims. (Cl. 260—78)

ABSTRACT OF THE DISCLOSURE

A method of separating polycaprolactam and caprolactam is disclosed in which these substances are intimately contacted with a solvent for the caprolactam, in which the thus formed mixture is heated under superatmospheric pressure at a temperature sufficiently high to form a solution, and in which this mixture is subjected to a pressure sufficiently low to cause expansion and cooling of the mixture to a temperature low enough to precipitate the polycaprolactam so that the solvent vaporizes, carrying with it the caprolactam and the polycaprolactam precipitates as a solid. Thereupon the thus formed vapor and the caprolactam are withdrawn under reduced pressure while the polycaprolactam is caused to impinge on surfaces heated to a temperature sufficiently high to melt the polycaprolactam and is collected.

---

This is a continuation application on applicants' prior copending application, Ser. No. 397,301, filed Sept. 17, 1964, now abandoned.

The present invention relates to the separation into its components of a mixture of a polyamide with water or with another solvent, a solution of the polyamide having been formed at elevated temperatures and increased pressure; more particularly the process aims at producing polyamide products which are poor in monomers.

Processes are already known for preparing polyamide dissolved in water, according to which polyamide and water are heated in an autoclave at temperatures between 100 and 180° C. without incurring depolymerization.

A process has been suggested wherein a melt of polyamide in water or solvent is treated under pressure in an autoclave as a eutectic liquid mixture above the boiling point of water or solvent, respectively, and below the melting point of the polyamide; this treatment was likewise made in an attempt to decrease the monomeric components. The extraction of polyamide made from caprolactam is done preferably with water having a temperature of 160 to 180° C. and at an excess pressure of about 10 atmospheres.

Another method proposes to eliminate water or solvent in gas form from a mixture with the polyamide, in a heated degassing vessel. The removal of water can be promoted by passing an inert gas, e.g., nitrogen, $CO_2$, and the like, or steam through the liquid.

The known processes for the separation of the polyamide from water or solvent, such as the passage of inert gas or superheated steam through the liquid, have certain not inconsiderable drawbacks. One of these is, for instance, the danger of freezing upon pressure decrease.

It is the object of the present invention to provide a method for effecting a separation of the mixture of polyamide from water or solvent, respectively, which will overcome the shortcomings of existing processes.

Generally speaking, the invention comprises spraying the solution of polyamide into a separating vessel through a nozzle which may be heated, if desired. In the separating vessel the mixture is allowed to settle and this results in a separation of the solid polyamide and the solvent or water, respectively, when water is used as solvent, steam is formed as a fog, which is sucked off carrying along the monomeric components or a part thereof. The aspiration occurs with a slight vacuum which is already created upon condensation of the sucked-off steam. The polyamide may then, for instance, be made to impinge on heated temperature controlled surfaces where it melts once more and collects in a sump. From there it is passed under pressure by a pump to the spinning nozzles and further processed in a known manner. The vapor of the solvent which forms provides, at the same time, an atmosphere of protecting gas.

The invention will now be described in a number of examples, but it should be understood that these are given by way of illustration and not of limitation, and that many changes in the details can be made without departing from the spirit of the invention.

A flow sheet is attached for illustrating the operating princples of the invention.

Example 1

Liquid polyamide is prepared in a polymerization vessel according to known methods from where it is passed to an extractor. Extraction may be carried out with water in countercurrent by passing the water at a temperature of 160 to 180° C. through the vessel for 4 hours.

At the bottom of the extractor, a mixture of polyamide and water will collect which is sprayed into a separating vessel through a nozzle preferably heated to a temperature ranging from 220 to 270° C. In the separator two phases will form, a solid phase and a gaseous phase. The gaseous phase consists of solvent vapor and monomeric components and is sucked off under a slightly reduced pressure of about 500 mm. Hg. The solid phase, i.e., the polyamide solidifies and is remelted onto heated surfaces or in a heated extruder. It is then distributed as a melt to several spinning devices, e.g., spinning nozzles.

Example 2

A polyamide melt formed in a "VK" tube, which is a tube for fully continuous polymerization, is passed under pressure into an extracting vessel by means of a pump. Simultaneously, water is added with the polyamide melt to the extracting vessel. Both components, polyamide and water, are intimately mixed in a mixing device provided with a stirrer. The temperature is 180° C. and the pressure in the mixing vessel is maintained at about 10 atmospheres gauge. The mixture of polyamide and water is then made to pass into a separating vessel with release of pressure through a nozzle which is preferably heated to about 220° C. or more. In the separating vessel, the mix will separate into two phases, one containing the vapor and the monomeric component the other the polymer. The vapor is then withdrawn under a slightly reduced pressure of about 500 mm. Hg.

Thereafter, the polyamide is made to impinge on heated temperature-controlled surfaces, as described in Example 1; the remelted polyamide is collected in a sump from where it is fed to the spinning nozzles by a pump, while remnants of water still present are separately removed.

While water has been described as a solvent, the process can very well be carried out with organic solvents, e.g. p-isopropyltoluene of the formula $$CH_3—C_6H_4—CH—(CH_3)_2$$ 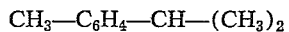

or with a mixture of water with alcohol; water with ketones; or ketones alone. The operating temperature will have to be above the boiling point of the solvent or solvent mixture, respectively, and below the melting point of the polyamide.

It should be understood, of course, that the foregoing disclosure relates only to preferred embodiments

What we claim is:

1. In a process for separating a mixture of polycaprolactam, caprolactam from which said polycaprolactam is formed, and a solvent for said caprolactam into its components, the steps which comprise: (a) passing said polycaprolactam in liquid state and including caprolactam to be removed into an extraction vessel; (b) forming a mixture of the polycaprolactam and caprolactam with a solvent for said caprolactam in said extraction vessel under super-atmospheric pressure; (c) spraying said mixture through a heated zone into a separating vessel at a pressure sufficiently low to cause expansion and lowering of the temperature sufficiently low to cause precipitation; (d) allowing the mixture to separate whereby a gaseous phase containing solvent and caprolactam, and a solid phase containing predominantly polycaprolactam are formed; (e) withdrawing the gaseous phase under reduced pressure; and (f) impinging the polycaprolactam on heated temperature-controlled surfaces which are at a temperature sufficiently high to melt said polycaprolactam, thereby remelting the same, and collecting the melt in a sump for final distribution to spinning nozzles.

2. The method of separating polycaprolactam after polymerization of caprolactam from said caprolactam, which comprises intimately contacting said polycaprolactam and caprolactam with a solvent for said caprolactam and heating the thus formed mixture under super-atmospheric pressure at a temperature sufficiently high to form a solution, thereby forming a heated mixture of said polycaprolactam, caprolactam and solvent; and subjecting the thus formed mixture to a pressure sufficiently low to cause expansion and cooling thereof to a sufficiently low temperature to precipitate said polycaprolactam, whereby said solvent vaporizes carrying with it said caprolactam, and the polycaprolactam precipitates as a solid.

3. Method according to claim 2 wherein the solvent is water.

4. Method according to claim 3 wherein the contacting temperature is about 160–180° C. and the contacting pressure is about 10 atmospheres.

5. Method according to claim 4 wherein the mixture is further heated to between about 220 and 270° C. prior to being simultaneously cooled and expanded.

6. The method of separating polycaprolactam after polymerization of caprolactam from said caprolactam, which comprises intimately contacting said polycaprolactam and caprolactam with a solvent for said caprolactam and heating the thus formed mixture under super-atmospheric pressure at a temperature sufficiently high to form a solution, thereby forming a heated mixture of said polycaprolactam, caprolactam and solvent; subjecting the thus formed mixture to a pressure sufficiently low to cause expansion and cooling thereof to a sufficiently low temperature to precipitate said polycaprolactam, whereby said solvent vaporizes carrying with it said caprolactam, and the polycaprolactam precipitates as a solid; withdrawing the thus formed vapor and the caprolactam carried therealong under reduced pressure; impinging said polycaprolactam on surfaces heated to a temperature sufficiently high to melt said polycaprolactam; and collecting the thus molten polycaprolactam.

No references cited.

WILLIAM H. SHORT, Primary Examiner.

H. D. ANDERSON, Assistant Examiner.